Sept. 2, 1941.  F. W. SLACK ET AL  2,254,325
MOTOR VEHICLE
Filed Jan. 14, 1939  4 Sheets-Sheet 2
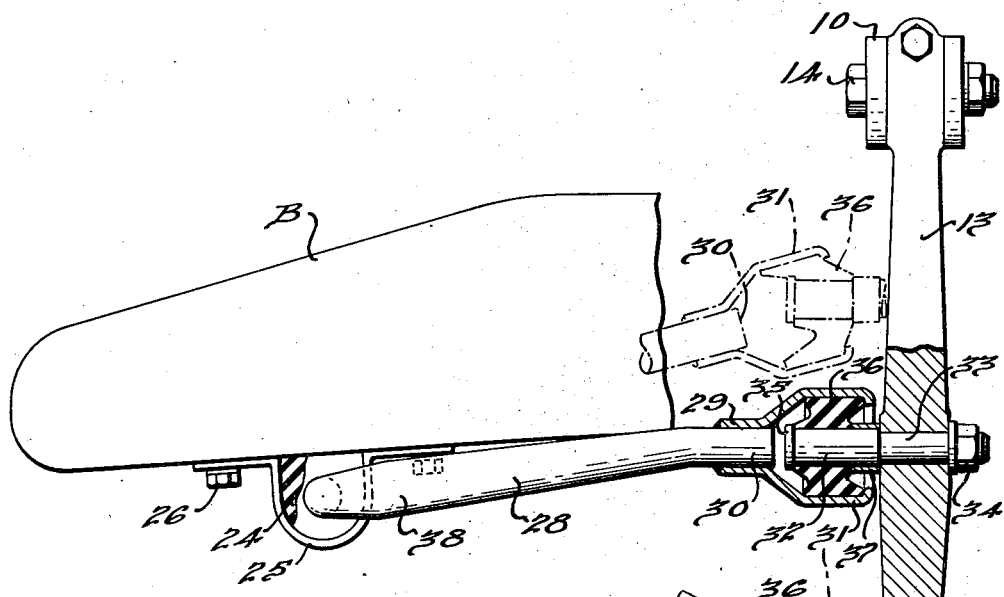
FIG. 3.
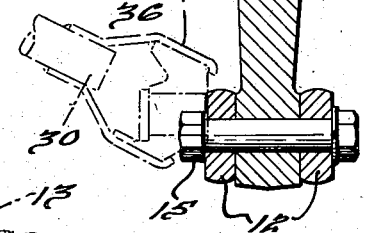
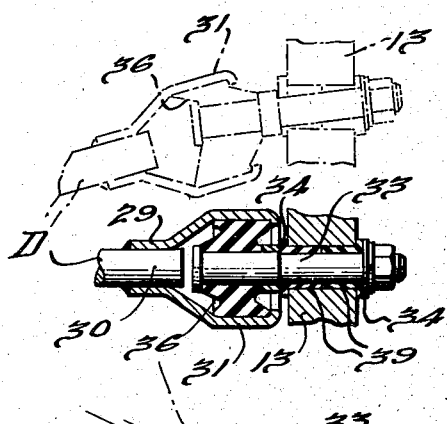
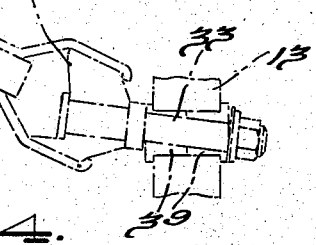
FIG. 4.
INVENTORS
Frederic W. Slack AND
BY CHESTER C. UTZ
ATTORNEYS.

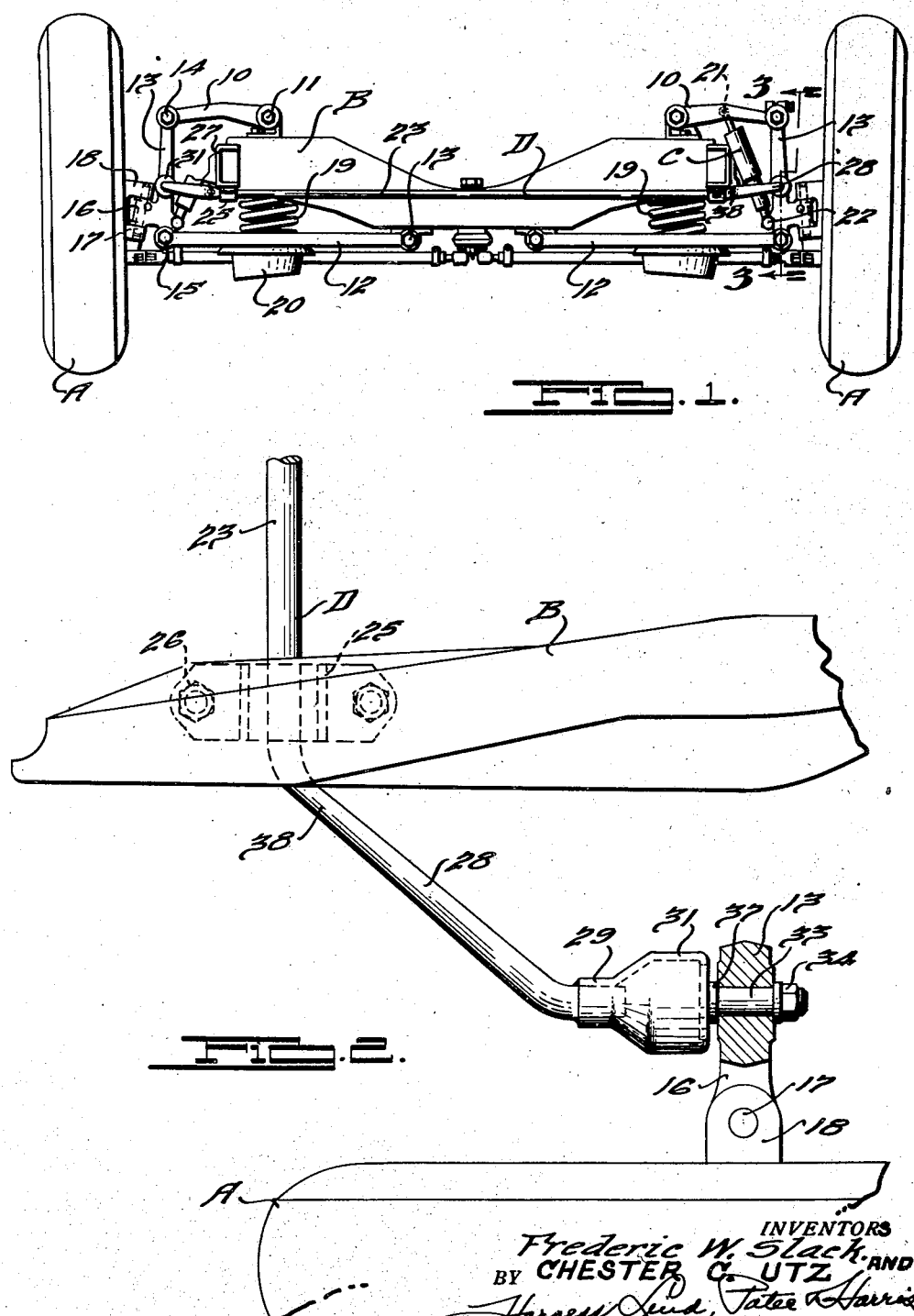

Sept. 2, 1941.  F. W. SLACK ET AL  2,254,325
MOTOR VEHICLE
Filed Jan. 14, 1939   4 Sheets-Sheet 3
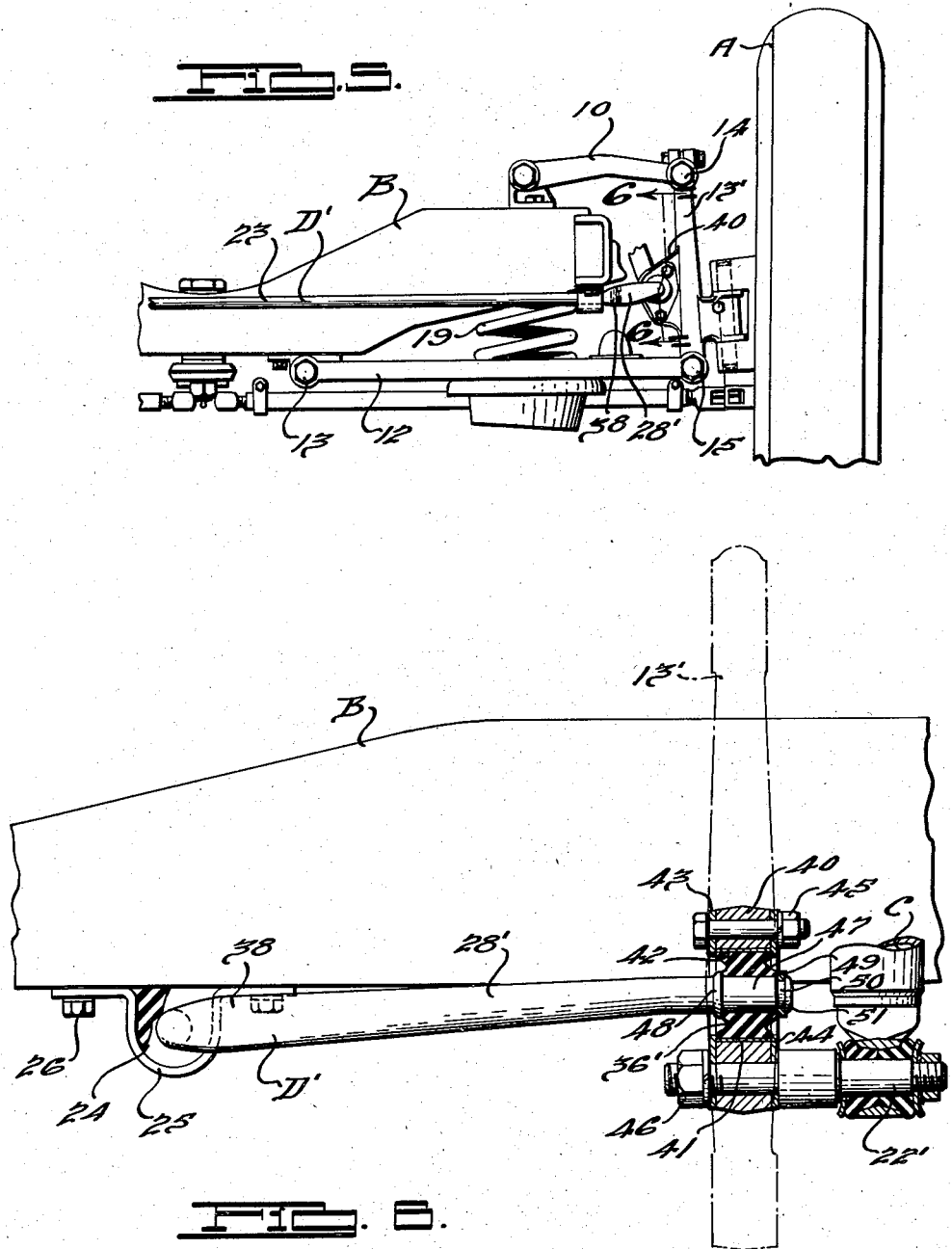
INVENTORS
Frederic W. Slack AND
BY CHESTER C. UTZ
Harness, Dick, Patee & Harris
ATTORNEYS

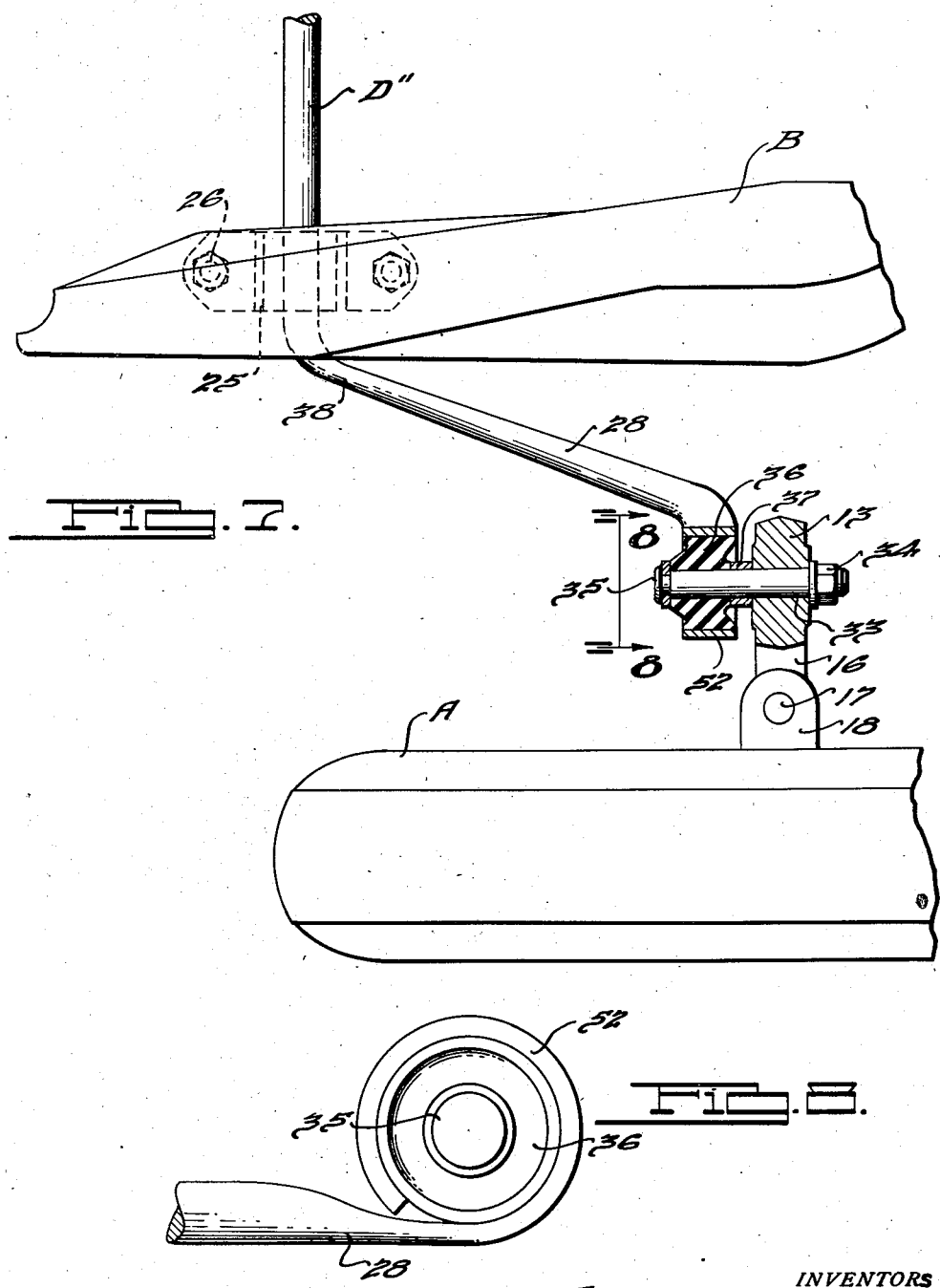

Patented Sept. 2, 1941

2,254,325

UNITED STATES PATENT OFFICE 2,254,325

MOTOR VEHICLE

Frederic W. Slack and Chester C. Utz, Detroit, Mich., assignors to Chrysler Corporation, Highland Park, Mich., a corporation of Delaware Application January 14, 1939, Serial No. 250,870

6 Claims. (Cl. 267—11)

This invention relates to motor vehicles and refers more particularly to improvements in stabilizing or anti-sway means for the bodies of vehicles.

Body sway is particularly experienced when the vehicle is rounding a curve and where independent wheel suspension systems are employed, it is customary to provide a torsion stabilizer bar connected through a system of links with the frame-pivoted wishbones of the suspension system.

An object of our invention is to provide a simplified low cost and efficient stabilizing mechanism especially adapted for vehicles equipped with independently sprung ground wheels.

A further object is to provide what may be termed a "linkless stabilizer" by eliminating the system of links ordinarily employed and so arranging the parts as to accommodate the desired operating functions of the parts of the wheel suspension.

In carrying out our invention in connection with the usual system of upper and lower frame-pivoted links connected at their outer ends by an upright wheel-carrying arm (knuckle support arm in the case of front steerable ground wheels), we preferably provide the stabilizer in the form of a torsion bar having a body portion extending transversely of the vehicle and having end portions connected directly to the upright wheel-carrying arm through means comprising a body of deformable rubber-like material serving to insulate the connection against rattle and to yieldingly accommodate the normal relative movement between the upright and frame structure of the vehicle.

A further object of our invention is to provide a stabilizer mechanism connected directly to the wheel-carrying arms of opposed ground wheels so arranged as to yieldingly accommodate movement of the arms toward or away from each other as the ground wheels rise and fall relative to the vehicle frame structure.

Further objects and advantages of our invention reside in the novel combination and arrangement of parts as will be more apparent from the following detailed description of several illustrative embodiments thereof, reference being had to the accompanying drawings in which:

Fig. 1 is a front elevational view of a portion of a typical motor vehicle construction showing the invention applied thereto.

Fig. 2 is a top plan view of a portion of the vehicle illustrating the connection for the stabilizing means with a typical ground wheel.

Fig. 3 is a sectional elevational view taken as indicated by the line 3—3 of Fig. 1.

Fig. 4 is a fragmentary view corresponding generally with a portion of the Fig. 3 stabilizing mechanism but illustrating the modified arrangement.

Fig. 5 is a front elevational view of a typical side portion of a motor vehicle generally as illustrated in Fig. 1 but showing a further modified arrangement of our stabilizing means.

Fig. 6 is a detail sectional elevational view taken as indicated by the line 6—6 of Fig. 5.

Fig. 7 is a view similar to Fig. 2 but illustrating a modified construction.

Fig. 8 is a detail elevational view taken as indicated by line 8—8 of Fig. 7.

Referring to the drawings, we have illustrated our invention in connection with the front steerable ground wheels A disposed opposite each other at the sides of a frame structure B which is adapted to support the body structure in the conventional manner.

The frame structure B is supported on the wheels A by a system of independent wheel suspension for each of the ground wheels, the illustrated suspension representing for the most part a well-known system comprising an upper link 10 pivoted at 11 on the frame structure and a lower link 12 pivoted at 13 with the frame structure. The links 10 and 12 may be of the usual wishbone type and preferably extend laterally outwardly of the vehicle for connection at their outer ends with the upright wheel carrying knuckle support arm 13 which is articulated at 14 and 15 with the upper and lower links, respectively.

The upright arm 13 carries a knuckle portion 16 (where the associated ground wheel is of the steerable type illustrated), this knuckle portion having the usual king pin 17 for swivelling the companion knuckle portion 18 of the associated wheel A. A coil spring 19 acts between the frame structure and a seat 20 supported by the lower link 12 thereby yieldingly supporting the weight of the frame structure on the ground wheel. Inasmuch as the suspension system is similar for each of the ground wheels, the description for the most part will be limited to the parts associated with the typical wheel.

With an independent wheel suspension system of the foregoing type, it will be apparent that each ground wheel A may rise and fall relative to the frame structure B independently of the remaining ground wheels of the vehicle, the links 10 and 12 maintaining the arms 13 in the desired upright position. If desired, a suitable shock absorber may be incorporated with each wheel suspension system and we have illustrated a shock absorber C of the hydraulic tubular type articulated at 21 and 22 respectively with an upper link 10 and the lower end portion of an associated arm 13.

We preferably provide our stabilizing means in the form of a torsion bar D having a central or intermediate body portion 23 of circular cross section, this body portion extending transversely across the vehicle for support at opposite sides of the frame structure in the bushings 24 preferably of rubber-like deformable material. Each bushing is supported in a bracket 25 secured by fasteners 26 to one of the main side rails 27 or other suitable part of the frame structure B. The bushings 24 serve to insulate the stabilizer bar D against transmission of vibration or shock to the frame structure and at the same time the bushings accommodate oscillation of the body portion 23 about its axis.

The stabilizer member D is provided with end portions 28 which are angled rearwardly and laterally outwardly from the body portion 23 adjacent the bushings 24, these end portions 28 being adapted for direct connection with the wheel-carrying arms 13, respectively. In the embodiment illustrated in Figs. 1–2, we have illustrated one preferred arrangement of forming this connection comprising a sleeve 29 secured as by welding to the rearwardly extending terminal portion 30 of each end portion 28, each sleeve 29 having an enlarged cylindrical portion 31 thereof freely receiving the forwardly extending enlarged portion 32 of a stud 33 which extends through an associated arm 13 and is securely fixed thereto by the fastener assembly 34. The forward end of the stud is provided with a head 35 and surrounding the stud portion 32 there is an annular body of deformable rubber-like material 36 serving to yieldingly connect the stabilizer member D with an arm 13.

If desired, the annular rubber body 36 may be vulcanized to the stud portion 32 and also to the sleeve portion 31 in order to prevent undesired surface movement between the rubber body and the parts connected thereby. In practice, we have found that the desired results may be conveniently obtained by vulcanizing the rubber body with the sleeve part 31, the rubber body being held fixed to the stud portion 32 by the clamping assembly 34 which acts to hold the rubber body on the stud between the head portion 34 and a sleeve 37 which is disposed between the arm 13 and the rubber body in surrounding engagement with the stud portion 32.

Where the stabilizing means is provided in the form of a torsion bar such as illustrated at D, such bar is necessarily of very tough steel and not of a character readily machined so that in most instances our illustrated arrangement of forming a connection between the torsion bar and the arm 13 through the stud 33 and sleeve 29 will be found expedient.

As each ground wheel A rises and falls relative to the frame structure, the associated stud 33 will be moved between the extreme positions illustrated in Fig. 3 in construction lines, although it will be understood that such extreme positions are not ordinarily experienced during normal operation of the motor vehicle. Such movement of the wheel is yieldingly accommodated by deforming the body 36 which nevertheless acts to compel the associated end portion 28 of the torsion bar to rise and fall with the wheel. During rising and falling of the ground wheel A, it will be apparent that the arm 13 has a slight movement toward and from the frame structure B and it is desirable to provide some means for yieldingly accommodating this movement of the arm 13 so as to relieve the parts of the wheel suspension and stabilizing means from undue strain. We have provided such means by flattening each end portion 28 adjacent the body portion 23 as generally indicated at 38 by increasing the height of each end portion in this region while diminishing the thickness. By reason of such construction the end portion 28 is permitted to spring inwardly and outwardly with respect to the frame structure while at the same time providing the desired rigidity against flexure when the end portion 28 imparts torsion movement to the body portion 23.

The deformable bodies 36 provide what may be termed a "lost-motion connection" between the stabilizer bar D and the arms 13 whereby slight relative displacements of the ground wheels A may freely take place without appreciable resistance at the torsion body portion 23. In this manner the desired freedom of action of the ground wheels is obtained for a boulevard ride although pronounced displacement of each ground wheel relative to the other will impart similar motion to the opposite ground wheel through the torsionally acting body portion 23 whereby to minimize sway and rolling effects of the frame structure in body, as is generally well known in the art.

Referring to Fig. 4, we have illustrated the parts generally as described in the preceding embodiment but in the present instance we have incorporated a pair of rubber bushings 39 between the stud 33 and the arm 13, each bushing having an annular flange 34 having face engagement with the arm 13 so as to insulate the parts of the assembly against transmission of noises and vibrations and also to assist in relieving the stud 33 from a certain amount of the strain in the deformable body 36, especially when the associated ground wheel is in one of the extreme positions illustrated in construction lines in Fig. 4.

Under such conditions the bushings 39 are deformed and assist the body 36 in accommodating the yielding connection between the arm and stabilizer bar.

Referring now to Fig. 5, the parts are generally as described in connection with Fig. 1 although in the present instance each wheel-carrying arm 13' is formed with a laterally extending bracket portion 40 having a cylindrical opening 41 into which is tightly fitted the annular sleeve 42 to which is vulcanized the deformable body 36'.

In order to further assist holding the deformable body 36' in its proper position within the cylindrical opening 41, we have provided a pair of plates 43, 44 respectively engaging the opposing faces of the arm 13', these plates being held in position by the fastener assemblies 45 and 46. The plates are formed with central openings and are arranged to slightly overlap the periphery of the associated body 36', such arrangement securely preventing displacement of the sleeve 42 in the direction of its axis.

In the present instance the stabilizer bar D' is constructed to correspond with the bar D except that each end portion 28' now has a terminal portion 47 thereof fitting within the body 36', this body being vulcanized to the portion 47, if desired. As a means of positioning the rubber body on the portion 47, the end portion 28' is formed with an annular shoulder 48 which locates the forward face of the body 36', the rear face being located by a washer 49 seated in an annular groove 50 of the portion 47, the terminus of this portion being upset at 51 in order to secure the parts in position. This upsetting avoids the necessity of machining the end portions of the torsion bar which is ordinarily difficult in practice, as aforesaid.

The assembly 46 in the Fig. 6 arrangement is utilized to provide the pivotal support 22' for the aforesaid shock absorber C. The operation of the Fig. 6 embodiment is substantially similar to that previously described, the body 36' yieldingly accommodating the necessary relative movement between the torsion bar and wheel support arm as the wheel rises and falls and the end portion 28' is permitted to spring in the regions 38 as in the previous embodiments.

Referring to Figs. 7 and 8 the arrangement of parts is generally similar to that shown in Fig. 2 but eliminates the separate sleeve 29. In Fig. 7 the stabilizer member D" has each of its end portions flattened ribbon-like and rolled into cylindrical form at 52 thereby forming a sleeve which is carried by and which is integral with an angled end portion 28. The stabilizer bar being of spring steel allows the cylindrical portion 52 to function as a retainer for the rubber body 36 which is inserted by opening the portion 52 sufficiently to receive the body, the portion 52 then tightly embracing the rubber body to prevent any slippage at the embraced body surface.

The body 36 is otherwise mounted on the arm 13 as in the previous embodiments and the operation and functions of the Fig. 7 arrangement is as previously set forth.

We do not limit our invention, in the broader aspects thereof, to any particular combination and arrangement of parts such as shown and described for illustrative purposes since various modifications will be apparent from the teachings of our invention and scope thereof as defined in the appended claims.

What we claim:

1. In a vehicle, the combination with opposite wheel carrying arms and link means independently suspending said arms for rising and falling movement toward and away from each other, of a torsion bar having a body portion extending transversely of the vehicle and end portions angled therefrom for connection with said arms respectively, and means yieldingly connecting each of said end portions with one of said arms, said end portions being reduced in one dimension thereof adjacent said body portion to accommodate springing of said end portions as said arms move toward and away from each other.

2. An article of manufacture comprising, a torsion bar having a body portion and end portions angled therefrom, said end portions being reduced in one dimension thereof adjacent said body portion to accommodate flexing of said end portions toward each other.

3. An article of manufacture comprising, a torsion bar having a body portion and end portions angled therefrom, said end portions being reduced in one dimension thereof and increased in another dimension thereof to accommodate flexing of said end portions toward each other while resisting flexing of said end portions in transmitting torsional stress to said body portion.

4. In a vehicle, the combination with a pair of opposite independently suspended wheel carrying arms and link means for swingingly supporting said arms, of a torsion bar having a body portion extending transversely of the vehicle and having end portions angled from said body portion for connection with said arms respectively, each of said connections comprising a sleeve carried by one of said end portions, a stud carried by an arm and projecting freely within the sleeve, and an annular body of deformable material between the stud and sleeve.

5. In a vehicle, the combination with a pair of oppositely disposed wheels and independent suspension for each wheel, each suspension including a member oscillated with the wheel associated therewith, of a rubber body carried by each of said oscillated members, and a stabilizer bar having its ends formed to embrace the rubber bodies respectively.

6. In a vehicle, the combination with a pair of opposite independently suspended wheel carrying arms and link means for swingingly supporting said arms, of a torsion bar having a body portion extending transversely of the vehicle and having end portions angled from said body portion for connection with said arms respectively, each of said connections comprising an annular body of deformable material supported by one of said end portions and a stud between an arm and said annular body, and means yieldingly mounting each of said studs in its said arm.

FREDERIC W. SLACK.
CHESTER C. UTZ.